(12) United States Patent
Gabay et al.

(10) Patent No.: US 9,396,459 B2
(45) Date of Patent: Jul. 19, 2016

(54) CAPACITY ACCOUNTING FOR HETEROGENEOUS STORAGE SYSTEMS

(71) Applicant: NetApp, Inc., Sunnyvale, CA (US)

(72) Inventors: Yarom Gabay, Newton, MA (US); Nagananda Sriramaiah Anur, Nashua, NH (US); Alexander Vinnik, Brookline, MA (US)

(73) Assignee: NETAPP, INC., Sunnyvale, CA (US)

( * ) Notice: Subject to any disclaimer, the term of this patent is extended or adjusted under 35 U.S.C. 154(b) by 287 days.

(21) Appl. No.: 13/796,847

(22) Filed: Mar. 12, 2013

(65) Prior Publication Data

US 2014/0280382 A1    Sep. 18, 2014

(51) Int. Cl.
| | | |
|---|---|---|
| *G06F 7/00* | (2006.01) | |
| *G06F 17/30* | (2006.01) | |
| *G06Q 10/10* | (2012.01) | |
| *G06Q 10/08* | (2012.01) | |

(52) U.S. Cl.
CPC .............. *G06Q 10/10* (2013.01); *G06Q 10/087* (2013.01)

(58) Field of Classification Search
CPC ............................ G06Q 10/10; G06Q 10/087
USPC ......................................................... 707/812
See application file for complete search history.

(56) References Cited

U.S. PATENT DOCUMENTS

| | | | |
|---|---|---|---|
| 7,353,358 B1 | 4/2008 | Marokhovsky | |
| 8,190,583 B1 | 5/2012 | Shekar et al. | |
| 8,296,544 B2 | 10/2012 | Beniyama et al. | |
| 8,332,860 B1 | 12/2012 | Yahalom et al. | |
| 8,364,858 B1 * | 1/2013 | Martin | G06F 13/00 707/809 |
| 2002/0087587 A1 * | 7/2002 | Vos | G06F 17/30306 |
| 2005/0114243 A1 * | 5/2005 | Scumniotales | G06Q 10/10 705/35 |
| 2010/0088296 A1 * | 4/2010 | Periyagaram | G06F 3/061 707/705 |
| 2012/0311260 A1 | 12/2012 | Yamagiwa et al. | |
| 2014/0156601 A1 * | 6/2014 | Strunk | G06F 17/30094 707/639 |

OTHER PUBLICATIONS

PCT Search Report and Written Opinion PCT/US2014/013025 dated May 30, 2014 (pp. 1-11).

\* cited by examiner

*Primary Examiner* — Van Oberly
(74) *Attorney, Agent, or Firm* — Klein, O'Neil & Singh, LLP

(57) ABSTRACT

Techniques to account for storage consumption and capacity allocation across heterogeneous storage objects are disclosed. A capacity accountability system can ascertain a set of heterogeneous storage objects provisioned for a storage consumer, where the heterogeneous storage objects is categorized by storage object hierarchy levels. The capacity accountability system can then identify an association between the storage consumer and a storage object hierarchy level and account for storage object consumption and storage capacity allocation of the storage consumer by normalizing storage consumption data and capacity allocation data at the storage object hierarchy level across the heterogeneous storage objects.

20 Claims, 9 Drawing Sheets

US 9,396,459 B2

CAPACITY ACCOUNTING FOR HETEROGENEOUS STORAGE SYSTEMS

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2013, NetApp, Inc., All Rights Reserved.

BACKGROUND

Storage of large quantities of data for application services is costly and complex. Typically, an information technology (IT) department of an enterprise works with different vendors to individually track purchase and usage of storage capacity for different storage needs. Because of differences in storage needs, a business entity may use different types of storage objects stored on different storage devices, accessible via different storage access protocols, and utilize different storage services. Typically, different manual accounting methods are used for keeping track of storage capacity of storage objects for different types of storage objects. However, a manual process to account for the storage capacity consumption and for the storage capacity allocation often result in inaccurate (e.g., duplicate) accounting due to the heterogeneous storage objects used. The resulting capacity accounting report thus is inaccurate and may result in a failure to optimize for a cost-effective storage solution for the business entity.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
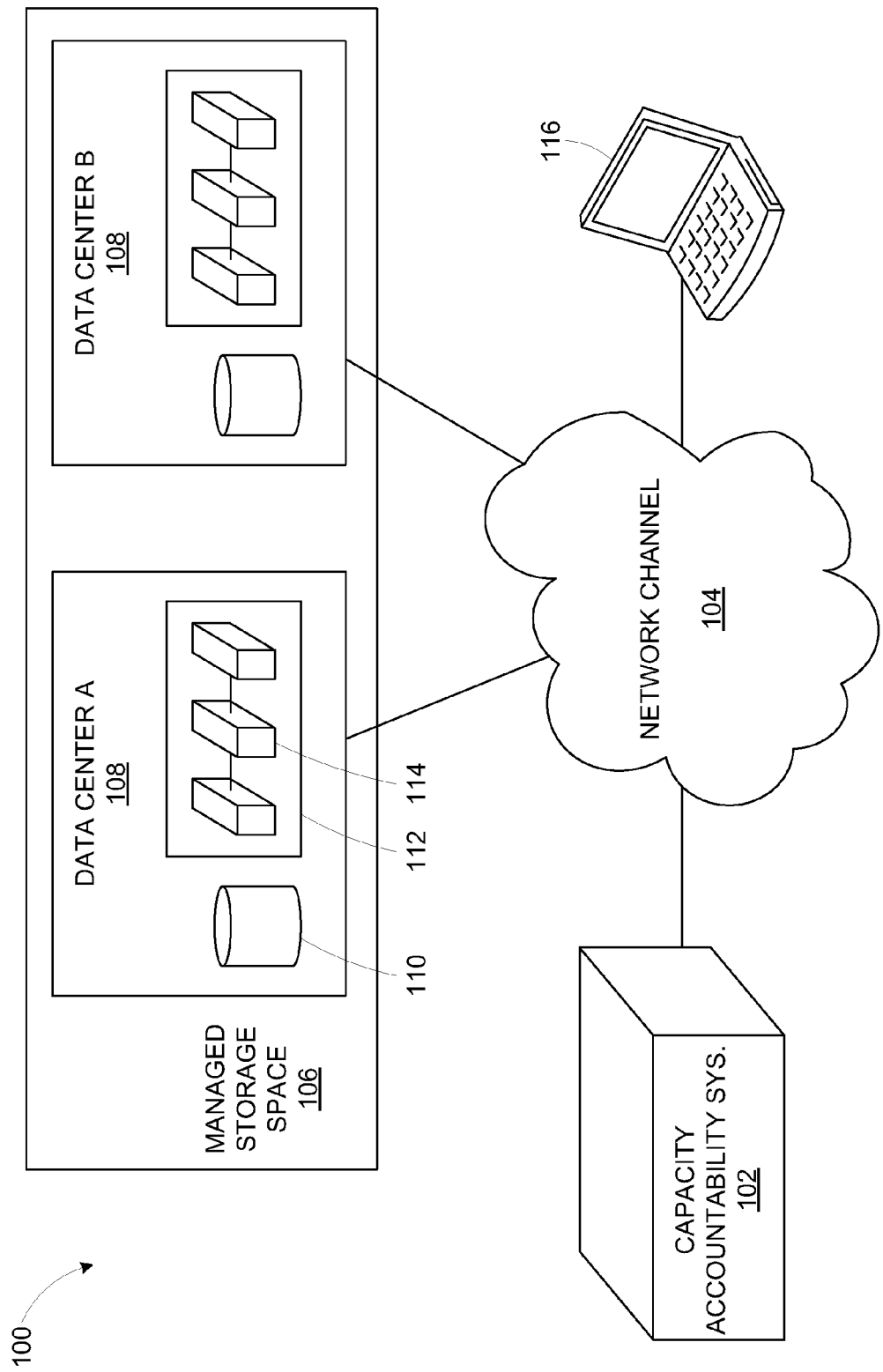
FIG. 1 is a block diagram illustrating a system environment for a capacity accountability system.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

The techniques introduced here enable storage administrators to account for provisioned and used storage capacity for capacity consumers accurately across data centers having heterogeneous storage objects. Storage capacity consumers can be, for example, applications, business entities, or physical or virtual hosts. The storage infrastructure across the data centers can be based on multiple storage device vendors utilizing multiple storage architectures. The storage infrastructure can maintain different storage tiers differing in terms the storage access capability and storage service capability. The storage infrastructure can also include multiple protocol access mechanisms allowing block access, file access, or both.

Today's applications use multiple storages across data centers with shared storage infrastructure. Each type of storage objects has a different format in terms of virtualization and indirection, making storage capacity consumption tracking error prone. Hence, tracking capacity across the multiple storages across different storage technologies is subject to inaccuracy.

To allow for accurate capacity accounting across the heterogeneous storage objects, the techniques introduced here reconcile different storage object hierarchy/containment levels across the heterogeneous storage objects to accurately reflect associations between storage capacity consumers and provisioned or used storage capacity. The disclosed capacity accountability system tracks the relationships amongst multiple storage capacity consumers and heterogeneous storage objects. The tracked relationship data structure is then used to normalize the storage object hierarchy/containment levels of the heterogeneous storage objects when accounting for storage capacity.

The normalization technique introduced here allows for transparent addition of new storage technologies into the managed storage space of the capacity accountability system, requiring almost no development time for the addition. Having multiple technologies in a single capacity accounting datamart allows storage administrators to quickly determine how new storage space is utilized. The capacity accounting datamart here refers to an accessible data store capable of returning specific capacity accounting data for specific storage consumer(s).

The disclosed capacity accountability system further provides an on-the-fly generation of capacity accounting reports. Because of the normalization technique, users of the system can quickly retrieve the necessary data regarding storage costs without technical knowledge of the storage architecture implementations in the managed storage space.

In various embodiments, a capacity trending mechanism that provides valuable business analytics for both a storage provider and a capacity consumer. The capacity trending mechanism enables the storage provider to accurately allocate storage devices and storage capacity tailor-fitted for various storage capacity consumers based on the trending information. The capacity consumer can efficiently select a cost-effective capacity usage plan from the storage providers based on the trending information and generated capacity provision modification from the capacity trending mechanisms.

Some embodiments have other aspects, elements, features, and steps in addition to or in place of what is described above. These potential additions and replacements are described throughout the rest of the specification.

Turning now to the figures, FIG. 1 is a block diagram illustrating a system environment 100 for a capacity accountability system 102. The capacity accountability system 102 can be connected via a network channel 104 to a managed storage space 106. The capacity accountability system 102 can be a general or special purpose computer system. The capacity accountability system 102 includes one or more devices with computer-functionalities, each device including a computer-readable storage medium (e.g., a non-transitory storage medium) storing executable instructions and a processor for executing the executable instructions. The managed storage space 106 includes a plurality of storage devices. For example, the managed storage space 106 can include at least one data center 108. The network channel 104 can be any form of communication network that is capable of providing access to a data storage system. The network channel 104 can be wired, wireless, or a combination of both. For example, the network channel 104 can include Ethernet networks, cellular networks, storage networks, or any combination thereof.

The network channel 104 may be, for example, a local area network (LAN), wide area network (WAN), metropolitan area network (MAN), global area network (GAN) such as the Internet, a Fiber Channel fabric, or any combination of such interconnects. The network channel 104 may include multiple network storage protocols including a media access layer of network drivers (e.g., gigabit Ethernet drivers) that interface with network protocol layers, such as the Internet Protocol (IP) layer and its supporting transport mechanisms, the Transmission Control Protocol (TCP) layer and the User Datagram Protocol (UDP) layer. The network channel 104 may include a file system protocol layer providing multi-protocol file access and, to that end, includes support for one or more of the Direct Access File System (DAFS) protocol, the Network File System (NFS) protocol, the Common Internet File System (CIFS) protocol and the Hypertext Transfer Protocol (HTTP) protocol. A VI layer can be implemented together with the network channel 104 to provide direct access transport (DAT) capabilities, such as Remote Direct Memory Access (RDMA), as required by the DAFS protocol. An Internet Small Computer System Interface (iSCSI) driver layer can be implemented with the network channel 104 to provide block protocol access over the TCP/IP network protocol layers, while a Fibre Channel (FC) driver layer receives and transmits block access requests and responses to and from the storage server. In certain cases, a Fibre Channel over Ethernet layer may also be operative in the network channel 104 to receive and transmit requests and responses to and from the storage server. The FC and iSCSI drivers provide respective FC- and iSCSI-specific access control to the blocks and, thus, manage exports of logical unit numbers (LUNs) to either iSCSI or FCP or, alternatively, to both iSCSI and FCP when accessing data blocks on the storage server.

Each datacenter can include at least a filesystem 110 that accounts for the hosts and storage objects within the filesystem 110. The filesystem 110 can be an interactive store that is capable of providing access to a set of storage objects, such as files, Logical Unit Numbers (LUNs), partitions, qtrees, and volumes. A qtree is a subset of a volume to which a quota can be applied to limit its size. The filesystem 110 can include multiple hierarchical levels of storage objects. A storage object hierarchical level is to an enumerated level of containment for a storage object. For example, a LUN can be at a higher storage object hierarchical level than a Q-tree and a Q-tree can be at a higher storage object hierarchical level than a volume. A storage object is a form of data container. Thus, the highest storage object hierarchical level can denote the largest accessible data container, capable of storing smaller containers, all the way down to the smallest accessible data container denoted by the lowest storage object hierarchical level.

The filesystem 110 can be hosted by a cluster 112 of storage hosts 114. The storage hosts 114 can be storage servers, such as the storage servers described in FIGS. 2A, 2B, and 3 discussed below.

The capacity accountability system 102 is for keeping an accurate capacity accounting of the managed storage space 106. The capacity accounting can include accounting for storage object consumption of storage consumers in the managed storage space 106 across heterogeneous storage objects. The capacity accounting can further include accounting for storage capacity allocation of the storage consumers in the managed storage space 106 across the heterogeneous storage objects. The capacity accounting can also include generating reporting of other metadata relating to the storage usage by each of the storage consumers, including idle capacity and storage usage trends. The storage usage trends can be used to calculate storage usage estimations and to recommend changes to the storage capacity provisions.

A storage consumer in this disclosure is defined as an account on the capacity accountability system 102 associated with an entity having control over the use of certain storage spaces on the managed storage space 106. For example, the storage consumer can be a business entity, a service application of a business entity, a division of a business entity, a physical host, or a virtual host. "Heterogeneous" storage objects in this disclosure are defined as storage objects, virtual or physical, that have at least two different manners of storing data. For example, heterogeneous storage objects can be accessible by at least two different access protocols. For another example, heterogeneous storage objects can be stored under at least two different storage architectures. For yet another example, heterogeneous storage objects can be stored on at least two different storage devices. As a more specific example, the storage objects can be LUNs, fixed partitions or flexible partitions, virtual volumes, or physical volumes across different types of filesystem architectures.

A client device 116 can access the capacity accountability system 102 across the network channel 104. The client device 116 can be any electronic device with a processor capable of data communication through the network channel 104. The client device 116 can access the capacity accounting reports generated by the capacity accountability system 102. For example, the client device 116 can be a computer operated by a storage network administrator or a computer operated by one of the storage consumer accounts.

Figure 2A:
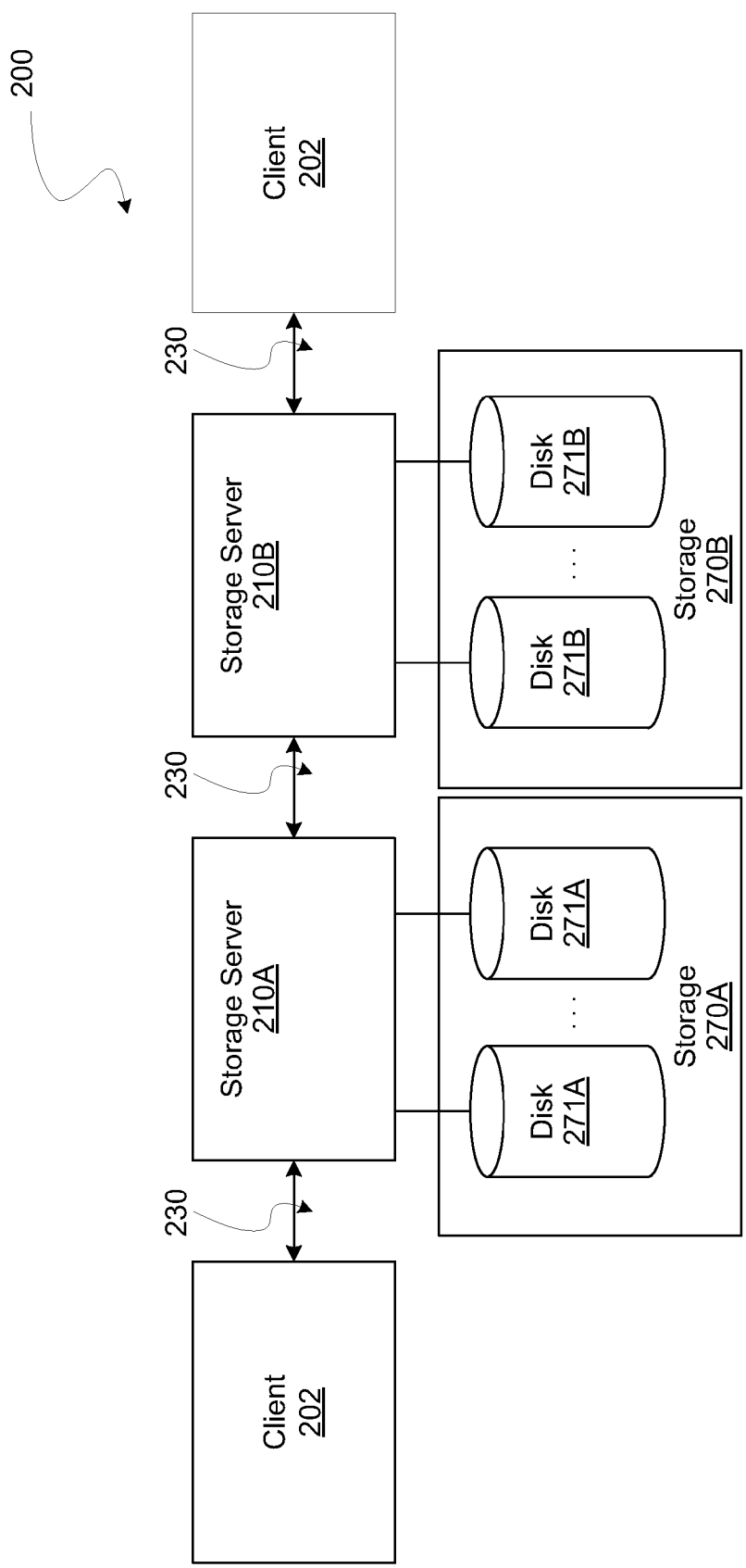
FIG. 2A is a block diagram illustrating a network storage system which may provide a portion of the managed storage space of the capacity accountability system in one embodiment.

FIG. 2A is a block diagram illustrating a network storage system 200 which may provide a portion of the managed storage space 106 of the capacity accountability system 102. Each of storage servers 210 (storage servers 210A, 210B) manages multiple storage units 270 (storage 270A, 270B) that include mass storage devices. The storage servers 210 provide data storage services to one or more clients 202 through a network 230. Network 230 may be, for example, LAN, WAN, MAN, GAN such as the Internet, a Fiber Channel fabric, or any combination of such interconnects. Each of clients 202 may be, for example, a conventional personal computer (PC), server-class computer, workstation, handheld computing or communication device, a virtual machine, or other special or general purpose computer.

Storage of data in storage units 270 is managed by storage servers 210 which receive and respond to various I/O requests from clients 202, directed to data stored in or to be stored in storage units 270. Data is accessed (e.g., in response to the I/O requests) in units of blocks, which in the present embodiment are 4 KB in size, although other block sizes (e.g., 512 bytes, 2 KB, 8 KB, etc.) may also be used. For one embodiment, 4 KB as used herein refers to 4,096 bytes. For an alternate embodiment, 4 KB refers to 4,000 bytes. Storage units 270 constitute mass storage devices which can include, for example, flash memory, magnetic or optical disks, or tape drives, illustrated as disks 271 (271A, 271B). The storage devices 271 can further be organized into arrays (not illustrated) implementing a Redundant Array of Inexpensive Disks/Devices (RAID) scheme, whereby storage servers 210 access storage units 270 using one or more RAID protocols. Although illustrated as separate components, for one embodiment, a storage server 210 and storage unit 270 may be a part of/housed within a single device.

Storage servers 210 can provide file-level service such as used in a network-attached storage (NAS) environment, block-level service such as used in a storage area network (SAN) environment, or both file-level and block-level service, or other data access services. Although storage servers 210 are each illustrated as single units in FIG. 2A, a storage server can, in other embodiments, be a distributed entity; for example, a storage server may include a separate network element or module (an "N-module") and disk element or module (a "D-module"). In one embodiment, the D-module includes storage access components configured to service client requests. The N-module includes functionality that enables client access to storage access components (e.g., the D-module) and may include protocol components, such as CIFS, NFS, or an IP module, for facilitating such connectivity. Details of a distributed architecture environment involving D-modules and N-modules are described further below with respect to FIG. 2B.

In other embodiments, storage servers 210 are referred to as network storage subsystems. A network storage subsystem provides networked storage services for a specific application or purpose. Examples of such applications include database applications, web applications, Enterprise Resource Planning (ERP) applications, etc., e.g., which maybe at least partially implemented in a client. Examples of such purposes include file archiving, backup, mirroring, and etc., provided, for example, on archive, backup, or secondary storage server connected to a primary storage server. A network storage subsystem can also be implemented with a collection of networked resources provided across multiple storage servers and/or storage units.

In the embodiment of FIG. 2A, one of the storage servers (e.g., storage server 210A) may function as a primary provider of data storage services to client 202. Data storage requests from client 202 are serviced using storage device 271A organized as one or more storage objects. In such an embodiment, a secondary storage server (e.g., storage server 210B) takes a standby role in a mirror relationship with the primary storage server, replicating storage objects from the primary storage server to storage objects organized on storage devices of the secondary storage server (e.g., disks 270B). In operation, the secondary storage server does not service requests from client 202 until data in the primary storage object becomes inaccessible such as in a disaster with the primary storage server, such event considered a failure at the primary storage server. Upon a failure at the primary storage server, requests from client 202 intended for the primary storage object are serviced using replicated data (i.e., The secondary storage object) at the secondary storage It will be appreciated that in other embodiments, network storage system 200 may include more than two storage servers. In these cases, protection relationships may be operative between various storage servers in system 200 such that one or more primary storage objects from storage server 210A may be replicated to a storage server other than storage server 210B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 210 should be taken as illustrative only.

Figure 2B:
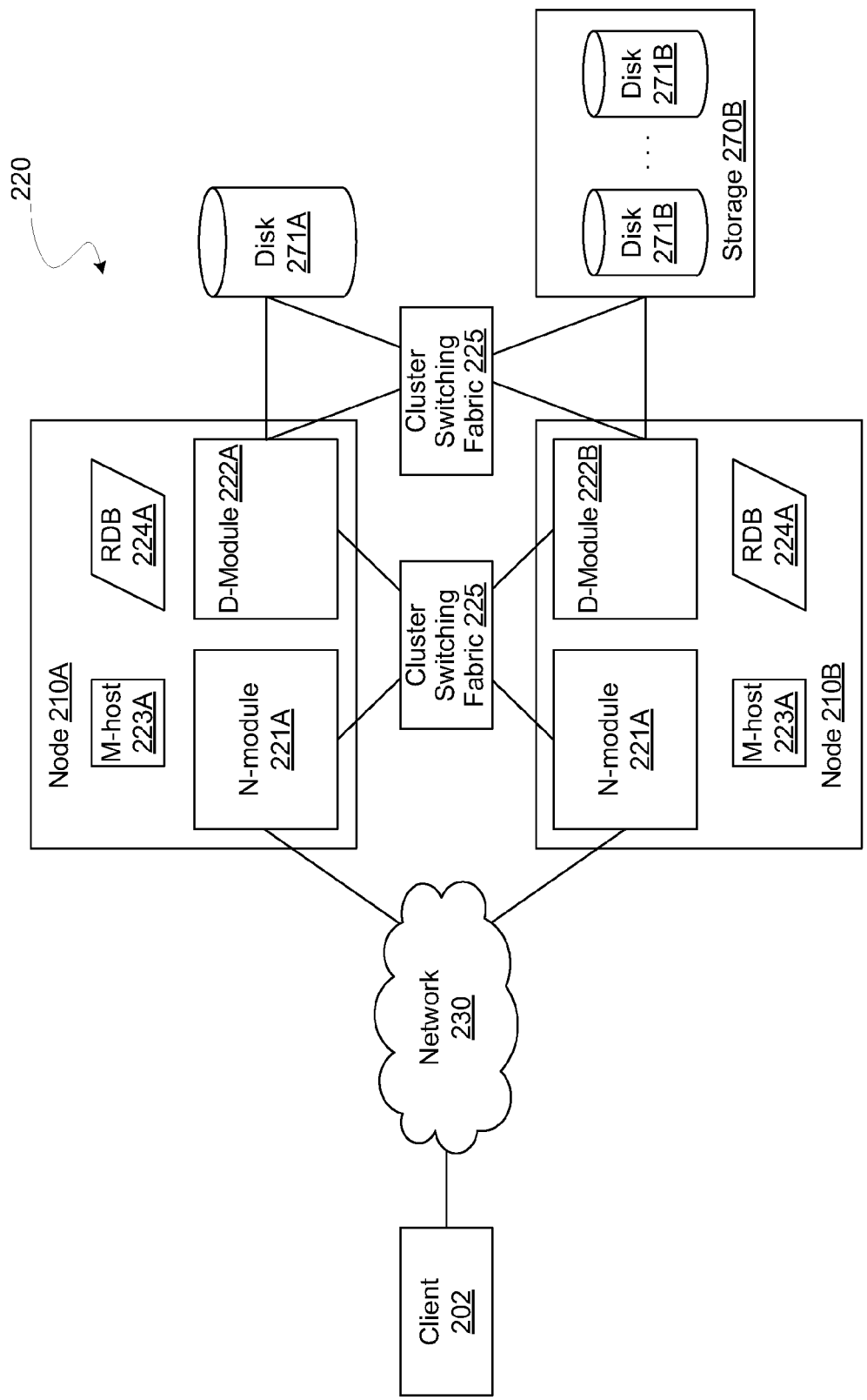
FIG. 2B is a block diagram illustrating a distributed or clustered network storage system which may provide a portion of the managed storage space of the capacity accountability system in one embodiment.

FIG. 2B is a block diagram illustrating a distributed or clustered network storage system 220 which may provide a portion of the managed storage space 106 of the capacity accountability system 102 in one embodiment. System 220 may include storage servers implemented as nodes 210 (nodes 210A, 210B) which are each configured to provide access to storage devices 271. In FIG. 2B, nodes 210 are interconnected by a cluster switching fabric 225, which may be embodied as an Ethernet switch.

Nodes 210 may be operative as multiple functional components that cooperate to provide a distributed architecture of system 220. To that end, each node 210 may be organized as a network element or module (N-module 221A, 221B), a disk element or module (D-module 222A, 222B), and a management element or module (M-host 223A, 223B). In one embodiment, each module includes a processor and memory for carrying out respective module operations. For example, N-module 221 may include functionality that enables node 210 to connect to client 202 via network 230 and may include protocol components such as a media access layer, IP layer, TCP layer, UDP layer, and other protocols known in the art. N-module 221 can be the client module 102 of FIG. 1.

In contrast, D-module 222 may connect to one or more storage devices 271 via cluster switching fabric 225 and may be operative to service access requests on devices 270. In one embodiment, the D-module 222 includes storage access components such as a storage abstraction layer supporting multi-protocol data access (e.g., the CIFS protocol, the NFS protocol, and the HTTP), a storage layer implementing storage protocols (e.g., RAID protocol), and a driver layer implementing storage device protocols (e.g., SCSI protocol) for carrying out operations in support of storage access operations. In the embodiment shown in FIG. 2B, a storage abstraction layer (e.g., file system) of the D-module divides the physical storage of devices 270 into storage objects. Requests received by node 210 (e.g., via N-module 221) may thus include storage object identifiers to indicate a storage object on which to carry out the request.

Also operative in node 210 is M-host 223 which provides cluster services for node 210 by performing operations in support of a distributed storage system image, for instance, across system 220. M-host 223 provides cluster services by managing a data structure such as a replicated database (RDB) 224 (RDB 224A, RDB 224B) which contains information used by N-module 221 to determine which D-module 222 "owns" (services) each storage object. The various instances of RDB 224 across respective nodes 210 may be updated regularly by M-host 223 using conventional protocols operative between each of the M-hosts (e.g., across network 230) to bring them into synchronization with each other. A client request received by N-module 221 may then be routed to the appropriate D-module 222 for servicing to provide a distributed storage system image.

It should be noted that while FIG. 2B shows an equal number of N-modules and D-modules making up a node in the illustrative system, a different number of N- and D-modules can make up a node in accordance with various embodiments of instantaneous cloning. For example, there may be a number of N-modules and D-modules of node 210A that does not reflect a one-to-one correspondence between the N- and D-modules of node 210B. As such, the description of a node comprising one N-module and one D-module for each node should be taken as illustrative only.

Figure 3:
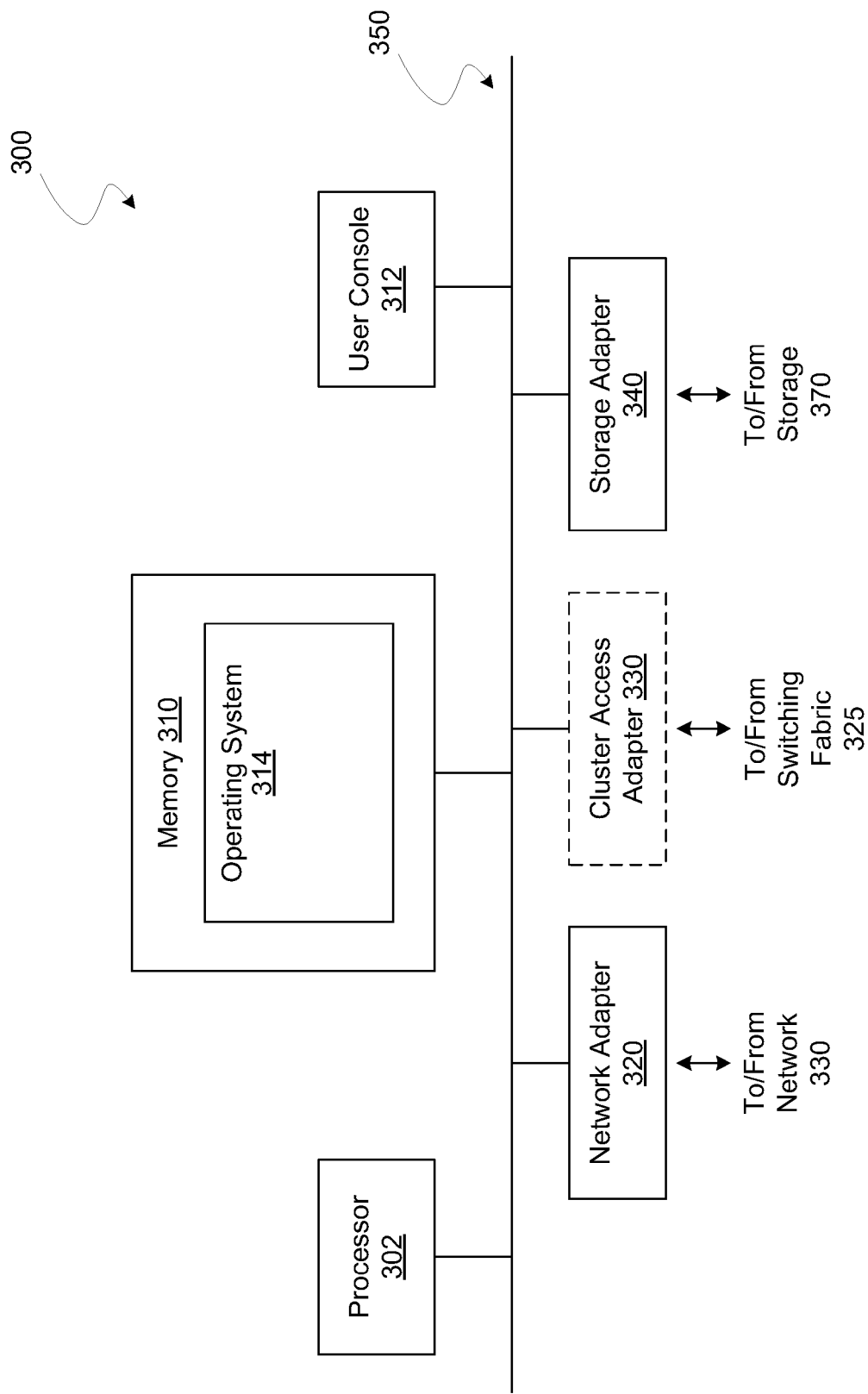
FIG. 3 is a block diagram illustrating an embodiment of a storage server.

FIG. 3 is a block diagram illustrating an embodiment of a storage server 300, such as storage servers 210A and 210B of FIG. 2A, embodied as a general or special purpose computer including a processor 302, a memory 310, a network adapter 320, a user console 312 and a storage adapter 340 interconnected by a system bus 350, such as a convention Peripheral Component Interconnect (PCI) bus. Certain standard and well-known components, which are not germane to the understanding of embodiments of the present invention, are not shown. The processor 302 is the central processing unit (CPU) of the storage server 210 and, thus, controls its overall operation. The processor 302 accomplishes this by executing software stored in memory 310. In one embodiment, multiple processors 302 or one or more processors 302 with multiple cores are included in the storage server 210. For one embodiment, individual adapters (e.g., network adapter 320 and storage adapter 340) each include a processor and memory for carrying out respective module operations.

Memory 310 includes storage locations addressable by processor 302, network adapter 320 and storage adapter 340 configured to store processor-executable instructions and data structures associated with implementation of a storage architecture. Storage operating system 314, portions of which are typically resident in memory 310 and executed by processor 302, functionally organizes the storage server 210 by invoking operations in support of the storage services provided by the storage server 210. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 302 and executable software can be implemented by hardware, such as integrated currents configured as programmable logic arrays, ASICs, and the like.

Network adapter 320 comprises one or more ports to couple the storage server to one or more clients over point-to-point links or a network. Thus, network adapter 320 includes the mechanical, electrical and signaling circuitry needed to couple the storage server to one or more client over a network. The network adapter 320 may include protocol components such as a Media Access Control (MAC) layer, CIFS, NFS, IP layer, TCP layer, UDP layer, and other protocols known in the art for facilitating such connectivity. Each client may communicate with the storage server over the network by exchanging discrete frames or packets of data according to pre-defined protocols, such as TCP/IP.

Storage adapter 340 includes one or more of ports having input/output (I/O) interface circuitry to couple the storage devices (e.g., disks) to bus 321 over an I/O interconnect arrangement, such as a conventional high-performance, FC or SAS link topology. Storage adapter 340 typically includes a device controller (not illustrated) comprising a processor and a memory, the device controller configured to control the overall operation of the storage units in accordance with read and write commands received from storage operating system 314. As used herein, data written by (or to be written by) a device controller in response to a write command is referred to as "write data," whereas data read by (or to be read by) device controller responsive to a read command is referred to as "read data."

User console 312 enables an administrator to interface with the storage server to invoke operations and provide inputs to the storage server using a command line interface (CLI) or a graphical user interface (GUI). In one embodiment, user console 312 is implemented using a monitor and keyboard.

When implemented as a node of a cluster, such as cluster 220 of FIG. 2B, the storage server further includes a cluster access adapter 330 (shown in phantom/broken lines) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 4:
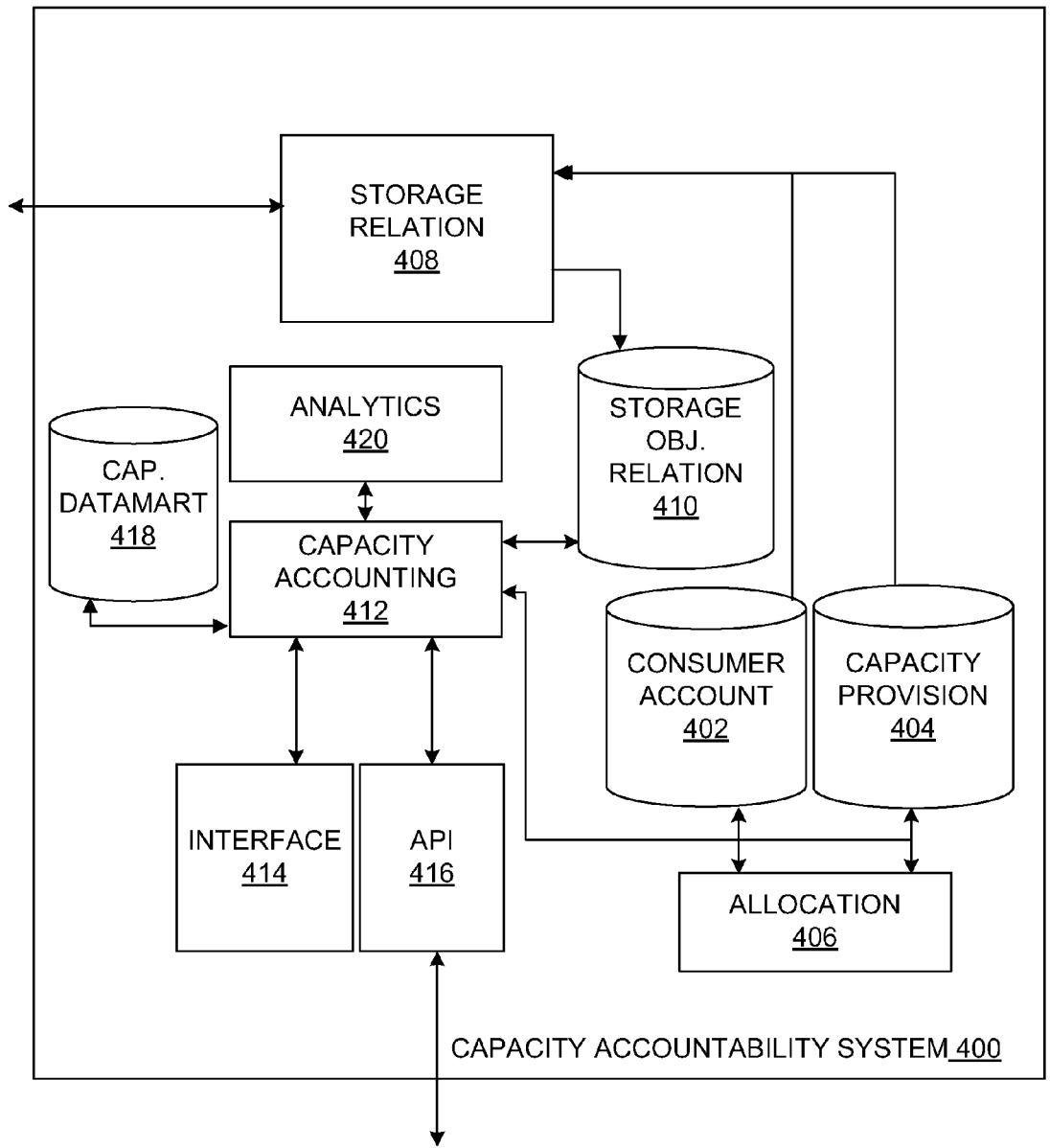
FIG. 4 is a block diagram illustrating a control flow of a capacity accountability system.

FIG. 4 is a block diagram illustrating a control flow of a capacity accountability system 400. The capacity accountability system 400 can be the capacity accountability system 102 of FIG. 1. The capacity accountability system 400 can include one or more methods of performing capacity accounting. The one or more methods can be implemented by modules described below. The modules can be implemented as hardware components, software instructions on non-transitory memory executable by a processor, or any combination thereof. For example, the modules described can be software modules implemented as instructions on a non-transitory memory capable of being executed by a processor or a controller on a machine described in FIG. 3.

Each of the modules can operate individually and independently of other modules. Some or all of the modules can be combined as one module. A single module can also be divided into sub-modules, each performing separate method step or method steps of the single module. The modules can share access to a memory space. One module can be coupled another module and access data processed by the another module by sharing a physical connection or a virtual connection, directly or indirectly.

The capacity accountability system 400 can include additional, fewer, or different modules for various applications. Conventional components such as network interfaces, security functions, load balancers, failover servers, management and network operations consoles, and the like are not shown so as to not obscure the details of the system.

The capacity accountability system 400 includes a consumer account store 402, a capacity provision store 404, an allocation module 406, a storage relation module 408, a storage object relation store 410, a capacity accounting module 412, an interface module 414, an application programming interface (API) module 416, a capacity datamart 418, and an analytics module 420. Alternatively, the allocation module 406 and the capacity provision store 404 can instead be out-side of the capacity accountability system 400 (not shown), communicating with modules of the capacity accountability system 400 via the API module 416.

The consumer account store 402 maintains a record entry for each of the storage consumers including a consumer account profile. The record entry can include one or more of the following, including an identifier unique to the storage consumer, a configuration file defining the reporting format of the capacity accounting generated by the capacity accountability system 400. The storage consumer accounts can be stored in graph structures, relational tables, linked lists, tree structures, or any combination thereof. The structure can denote how one storage consumer account has control over another storage consumer account. For example, the storage consumer accounts can be stored in a hierarchical structure where a root node includes a business entity consumer account, and the specific business divisions, service applications, content groups, and data volumes are consumer accounts constituting branch nodes or leaf nodes. Access to the record entries can be restricted such that a security entry or key associated with the storage consumer is required for access.

The capacity provision store 404 maintains a record of capacity allocation provisions for each storage consumer accounts. The capacity allocation provisions can be allocated by the allocation module 406. Each of the capacity allocation provisions specifies an allocation of a storage object to the each storage consumer account. Each capacity allocation provision can include a constant capacity allocation, such as 1 TB of data capacity. The capacity allocation can also be variable defined by a capacity provision rule. For example, the capacity allocation can be ten percent of storage capacity in a storage cluster, where the storage capacity of the storage cluster can increase or decrease during operation. The allocation module 406 can further specify a tier level for each capacity allocation provision. The tier level is defined by storage object type and storage object service type. The storage object type, for example, can include: a storage device model, such as a NetApp™ 6000 series storage server, a storage architecture type, such as NAS or SAN, a file system layout architecture, such as a write anywhere file layout (WAFL), an access protocol, such as NFS, SCSI, or CIFS, a storage device type, such as solid state drive, 7200 RPM hard disk, or 15000 RPM hard disk, or any combination thereof. The storage object service type, for example, can include replication service, backup service, mirroring service, deduplication service, or any combination thereof.

The allocation module 406 stores a set of rules to determine the specific tier level based on the storage object type or the storage object service type for each storage object or each set of storage objects. Storage objects having different storage object types and/or different storage object service types can be assigned the same storage tier level based on the set of rules. The tier level of a storage object can be re-configured based on available hardware and available storage services. For example, a storage object type of a storage object can be changed by reconfiguring the storage object to utilize a different set of storage host servers. A storage object service type of a storage object can be changed by removing replication service of the storage object.

Specific storage objects can be allocated for the storage consumer account through the allocation module 406. The allocation module 406 can store one or more network paths to access the storage objects associated with the storage consumer in the consumer profile stored on the consumer account store 402. The allocation module 406 can generate and store the capacity allocation provisions on the capacity provision store 404.

The storage relation module 408 is configured to generate a relationship data structure of heterogeneous storage objects available on the managed storage space 106 of FIG. 1. The relationship data structure can associate each of the heterogeneous storage objects with at least one of the storage consumer accounts known to the capacity accountability system 400. The relationship data structure can be stored on a storage object relation store 410. The relationship data structure can be, for example, a data graph, a relational database, or a tree structure. The relationship data structure can also store a specific storage content associated with each of the heterogeneous objects. The specific storage content can be based on a specific service application provided by the storage consumer. For example, the specific storage content can be profile picture photographs provided by an indexed photograph content provider service of a storage consumer.

The storage relation module 408 can generate the relationship data structure by traversing each instance of the filesystem 110 across the managed storage space 106. The storage relation module 408 can also generate the relationship data structure based on the associations generated through the allocation module 406.

The capacity accounting module 412 performs capacity accounting for one or more of the storage consumers. The capacity accounting module 412 is configured to generate a storage object consumption accounting that is specific for the one or more storage consumers. A storage object consumption accounting is a structured report to present how much storage capacity is used by one or more particular storage consumer. The capacity accounting module 412 is further configured to be able to generate a storage capacity allocation accounting. A storage capacity allocation accounting is a structured report to present how much storage capacity is provisioned/allocated to one or more particular storage consumers. The structured reports can be interactive to answer questions from a report reader about specific storage objects and about specific storage consumers. For example, the report reader can query regarding specific storage consumers. The report reader can also sort or filter based on specific storage consumers or storage object types. The capacity accounting module 412 can be configured and activated via an interface module 414. Once configured, the capacity accounting module 412 can generate the capacity accounting reports periodically. The capacity accounting module 412 can also be configured and activated via an API module 416 (application programming interface module).

When accounting for storage capacity allocation and storage object consumption, the capacity accounting module 412 normalizes the storage capacity allocation data and the storage consumption data from the storage object relation store 410 to avoid duplicate accounting. For example, when a first storage object includes a second storage object or vice versa, the capacity accounting module 412 can discount a first consumption data of a first storage object when a second consumption data of a second storage object has already been accounted for. That is, when the first storage object and the second storage object are within the same branch of storage object containment hierarchy, the consumption data is accounted for once. For another example, the capacity accounting module 412 can account for a single storage object consumption when a plurality of storage hosts maps to a single storage object. A host group table including storage object types of each host storage server and paths to storage objects on the host storage server can be stored on the storage object relation store 410 for the purpose of capacity accounting.

The capacity accounting module 412 also includes a mechanism to reconcile duplicate capacity accounting due to the relationships between the storage consumers. The capacity accounting module 412 can normalize the capacity accounting by tracking the relationships amongst the multiple storage capacity consumers, including a relationship tree of the storage consumers in the consumer account store 402. For example when accounting for storage capacity, the capacity accounting module 412 can account a single storage capacity allocation for a plurality of application services of a business entity sharing storage space on a single storage object. Here, the plurality of application services each can have a storage consumer account that is a subservient storage consumer account under the storage consumer account of the business entity. In this normalization scheme, the capacity accounting module 412 identifies a single storage consumer that can account for the entirety of the storage capacity allocation. The association between the application services of the business entity can be identified from the consumer account store 402.

These normalization mechanisms can apply to both accounting of capacity allocation and capacity consumption. The normalized capacity accounting data can be stored in a capacity datamart 418. The capacity datamart 418 can be indexed for easy querying of the capacity accounting for individual or groups of storage consumers.

The capacity accountability system 400 can include an analytics module 420. The analytics module 420 can calculate a storage usage trend based on the capacity accounting by the capacity accounting module 412. The storage usage trend can be generated based on ratio of storage capacity consumed over allocated capacity. The storage usage trend can also be based on read/write access frequency of the storage objects for the storage consumer. The storage trend generated can be specific to a service application of the storage consumer. The analytics module 420 can determine a modification to a capacity allocation provision based on the storage usage trend calculated.

The storages, or "stores", described in this disclosure are hardware components or portions of hardware components for storing digital data. Each of the storage can be a single physical entity or distributed across multiple physical devices. Each of the storage can be on separate physical device or share the same physical device or devices. Each of the stores can allocate specific storage spaces for run-time applications.

The techniques introduced in the modules herein can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Figure 5:
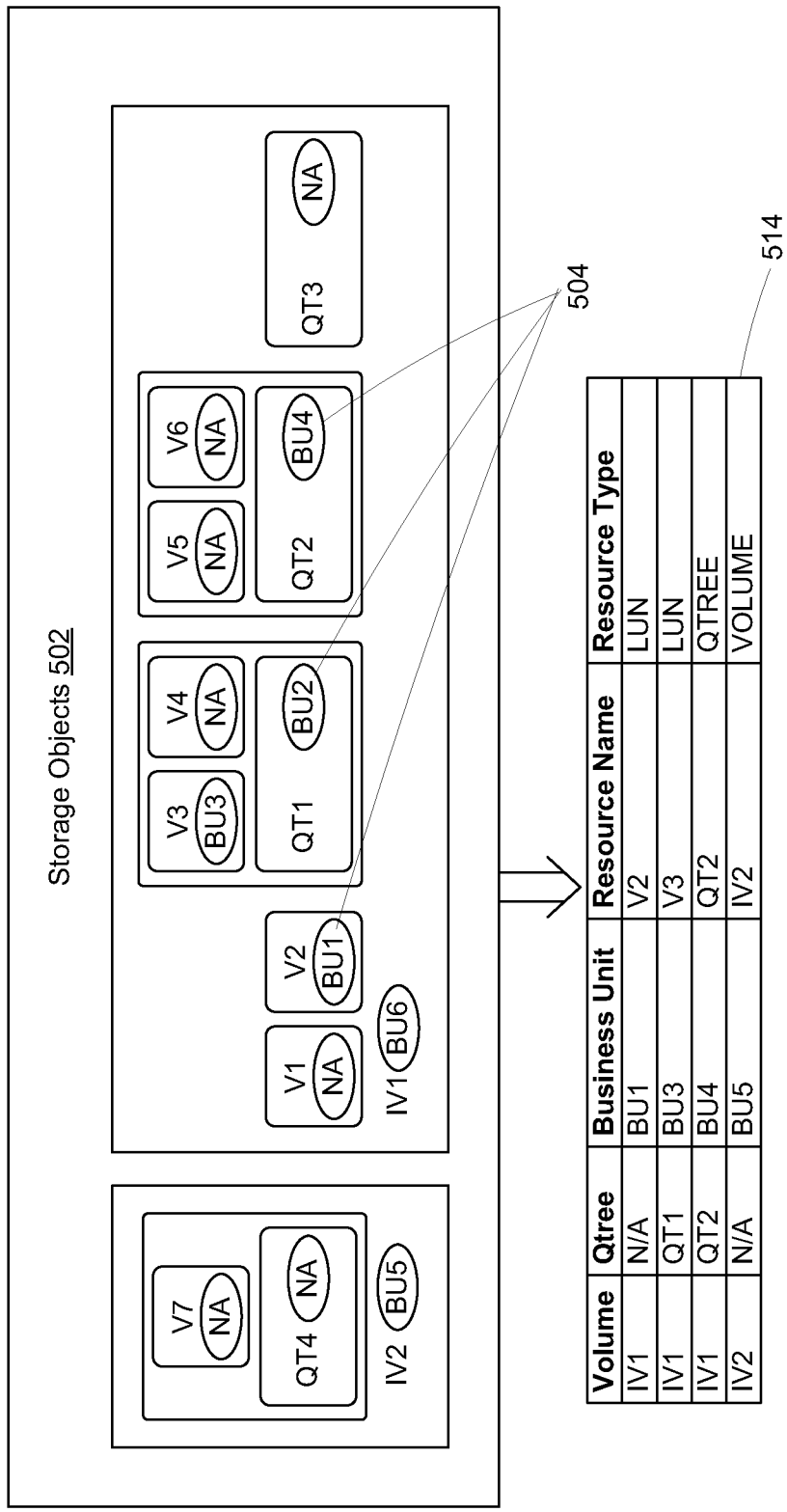
FIG. 5 is a block diagram illustrating an example of a mechanism to avoid duplication of capacity accounting for storage objects in different storage object hierarchy levels.

FIG. 5 is a block diagram illustrating an example of a mechanism to avoid duplication of capacity accounting for storage objects 502 in different storage object hierarchy levels. Each of the storage objects 502 is associated with a capacity allocation provision 504 that charges the storage object to a storage consumer. In this example, a LUN is the highest level of storage object hierarchy levels. The mechanism traverses storage objects, following hierarchy levels from the top level (LUNs), down to Q-trees and volumes, which is the lowest-level chargeable object. The mechanism determines to which storage consumer the storage object belongs, and accounts for the capacity consumption or the capacity allocation in an accounting database, such as the storage object relation store 410. Storage access technology, virtualization type, accessing host, service application identifier, protection service type, and tier-level associated with each storage object can also be saved to the storage object relation store 410.

In this example, the mechanism ensures that when performing a capacity accounting, a storage object (such as a LUN) is not charged to one storage consumer, while another storage object (such as a Q-tree of the LUN or a volume of the LUN) with a higher storage object hierarchy level (i.e., a larger data container) is charged to another storage consumer. Any capacity which was not charged to any storage consumer is reported as "not charged capacity," and the storage provider administrator can be prompted about unaccounted for capacity consumption or capacity allocation.

In this example, at the top level, LUNs V2 and V3 are first charged to respective associated storage consumers (i.e., BU1 and BU3). Then Q-tree QT2 is charged to the storage consumer BU4 because QT2 has an assigned storage consumer but the LUNs of QT2 does not have an assigned consumer. Then at the volume level, internal volume IV2 is charged to the storage consumer BU5 because none of its child storage objects have an assigned storage consumer.

An accounting table 514 illustrates the resulting capacity accounting under the mechanism to avoid duplicates of capacity accounting. In one example, each LUN can be restricted to only one storage consumer. The accounting table 514 does not include the storage objects V1, V4, V5, V6, V7, QT3, and QT4 because they do not have an assigned storage consumer. The storage objects QT1 and IV1 were not included in the accounting table 514 because their children were not included.

The mechanism described above implements support for capacity accounting of heterogeneous storage systems in the managed storage space 106, spanning storage access technologies (SAN, NAS, HTTP or any other technology), data centers (the physical storages can be in different geographical or logical locations), storage architectures (different RAIDS, disk types and data protection technologies), virtualization (physical and virtual storages and/or physical and virtual hosts), or any combination thereof. The mechanism described enables capacity accounting where each storage consumer can have assigned storage capacity on different storage systems and each storage system supports multiple storage consumers.

Figure 6:
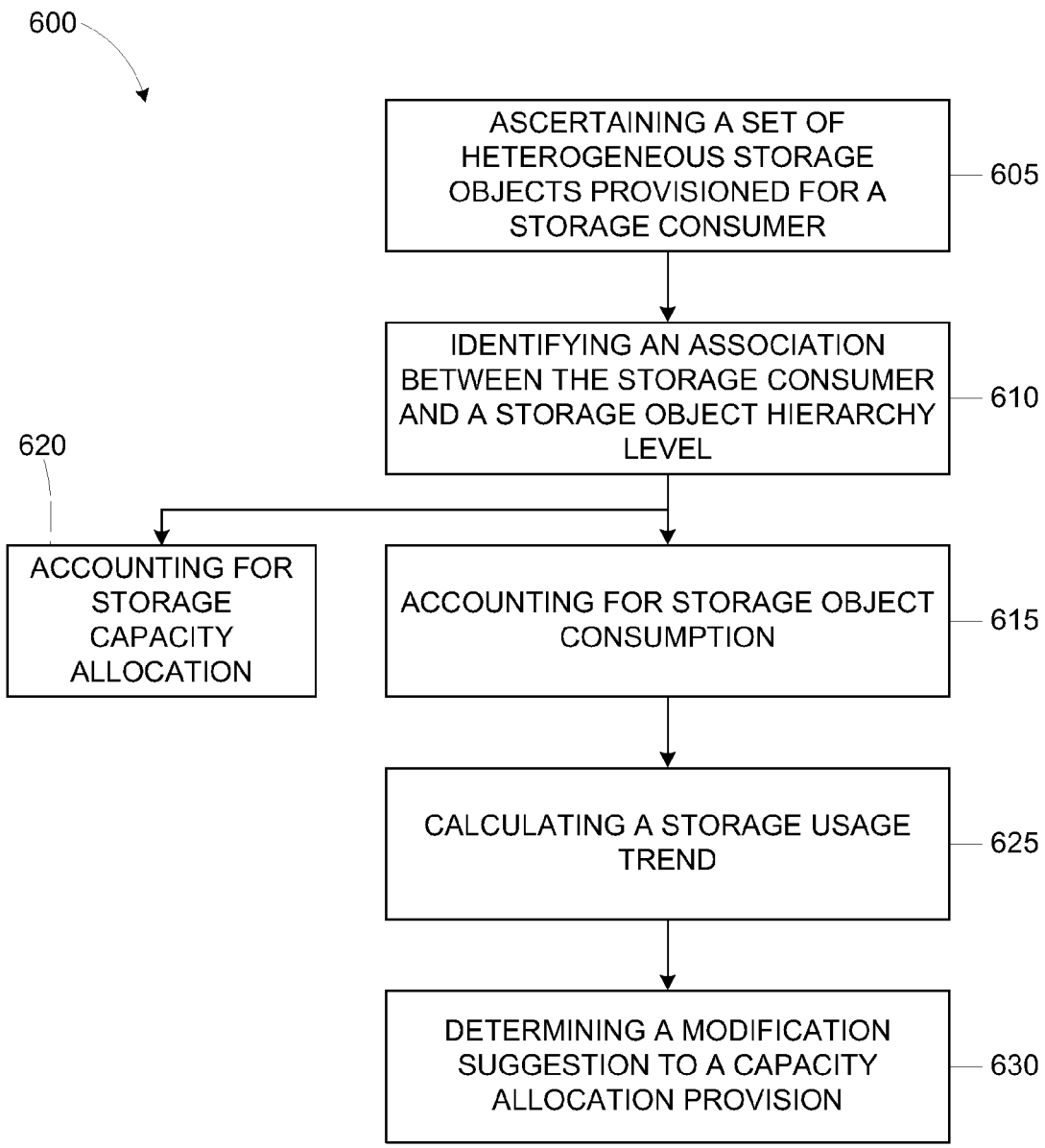
FIG. 6 is a flow diagram illustrating an example of a flow chart of a method of operating the capacity accountability system.

FIG. 6 is a flow diagram illustrating an example of a flow chart of a method 600 of operating the capacity accountability system 102. At a step 605, the capacity accountability system 102 ascertains a set of heterogeneous storage objects provisioned for a storage consumer. The heterogeneous storage objects are categorized by storage object hierarchy levels. The capacity accountability system 102 can ascertain the set of heterogeneous storage objects by determining the set by using a relationship data structure, such as the storage object relation store 410, of storage consumer accounts and managed storage objects. The step 605 can be performed by the storage relation module 408.

The method 600 continues on to a step 610 where the capacity accountability system 102 identifies an association between the storage consumer and a storage object hierarchy level. The step 610 can be performed via the interface module 414 or the capacity accounting module 412. The association can be selected from the storage object hierarchy levels of the identified set of the heterogeneous storage objects. The selection can be made based on a configuration parameter to the capacity accounting module 412.

Following the step 610 in a step 615, the capacity accountability system 102 can account for storage object consumption of the storage consumer by normalizing storage consumption data at the storage object hierarchy level across the set of the heterogeneous storage objects. The capacity accountability system 102 can also, in a step 620, account for storage capacity allocation of the storage consumer by normalizing storage capacity allocation data at the storage object hierarchy level across the heterogeneous storage objects. The normalizing step can be based on the normalizing mechanisms described above for the capacity accounting module 412. Optionally, the step 620 includes calculating an idle capacity of the storage consumer based on the accounting of storage object consumption and the accounting of storage capacity allocation for the storage consumer. Both the step 615 and the step 620 can be performed by the capacity accounting module 412.

Once an accounting of the storage object consumption is determined, the capacity accountability system 102 can calculate a storage usage trend based on the accounting of storage object consumption in a step 625. The storage usage trend can be calculated based on a percentage of the storage capacity allocated in a storage object that is actually consumed by the storage consumer. For example, a capacity consumed percentage per time period (such as day, week, or month) can be calculated. The storage usage trend can also be calculated based on access pattern of the storage object, including how frequently the storage object is written to or how frequently the storage object is read.

With the storage usage trend calculated, the capacity accountability system 102 can then determine a modification suggestion to a capacity allocation provision of the storage consumer based on the storage usage trend in a step 630. For example, when the provisioned capacity usage percentage is low, a modification suggestion to decrease provisioned capacity can be determined. For another example, when the access frequency of a storage object is low, a modification suggestion to lower the provisioned tier level can be determined, where the suggested modification tier level includes a less frequent replication service. Both step 625 and step 630 can be performed by the analytics module 420.

Figure 7:
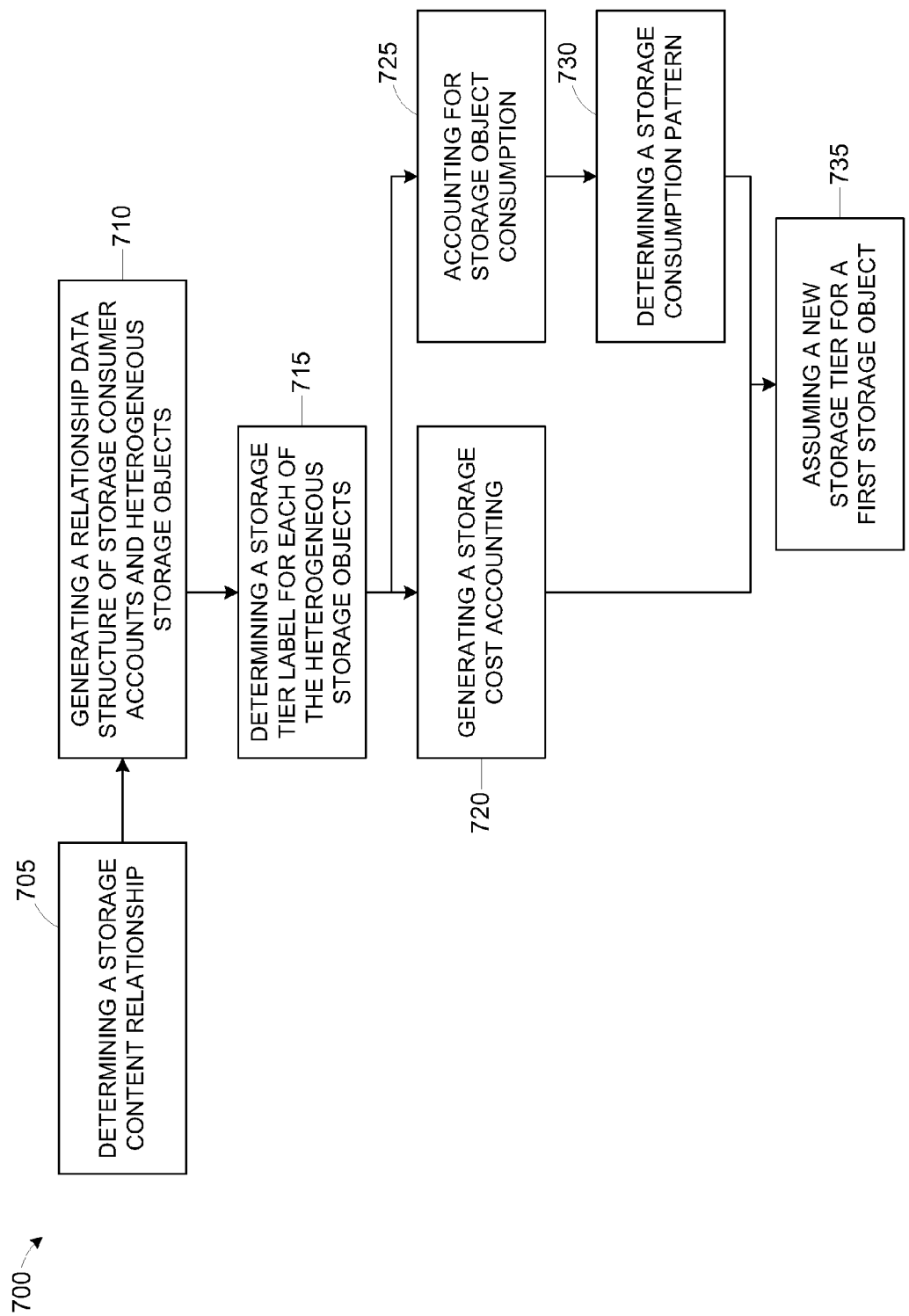
FIG. 7 is a flow diagram illustrating another example of a flow chart of a method of operating the capacity accountability system.

FIG. 7 is a flow diagram illustrating another example of a flow chart of a method 700 of operating the capacity accountability system 102. At a step 705, the method 700 includes determining a storage content relationship between a primary storage object and a replicated storage object of the heterogeneous storage objects, where the primary storage object and the replicated storage object are updated based on same storage content. Upon determining the storage content relationship, the method 700 continues to a step 710 of generating a relationship data structure of storage consumer accounts and heterogeneous storage objects. The relationship data structure can include the storage content relationship determined in the step 705. The steps 705 and 710 can be performed by the storage relation module 408.

From the relationship data structure, the storage relation module 408 can determine a storage tier label for each of the heterogeneous storage objects based on a storage object service type and a storage object technology type in a step 715. The storage tier label can be associated with a storage cost. The step 715 can be performed by the allocation module 406. The storage cost of the storage tier can be calculated in at least two different ways. The storage cost can be based on a charge-as-you-go model, where the storage cost is presented as a cost per storage capacity consumed. The storage cost can also be based on a provision cost model, where the storage cost is presented as a cost per capacity allocated.

Following step 715, the method 700 includes a step 720 of generating a storage cost accounting of a storage consumer by traversing the relationship data structure based on the storage tier label. For example, a list of storage objects connected to the storage consumer or sub-divisions of the storage consumer can be determined from the relationship data structure. The list of storage objects can be normalized by discounting storage objects contained by other storage objects on the list. The list can also be normalized by discounting storage objects associated with sub-divisions of the storage consumer that is already accounted for. Then the storage costs of the tier levels of the remaining storage objects on the normalized list is accrued to determine the storage cost accounting.

The storage cost accounting can include a storage cost specifically associated with the storage content referred to in the step 705. For example, the accounting can be performed by traversing through the storage objects having a relationship associated with the storage content. The accounting in the step 720 can be performed by the capacity accounting module 412.

Following the step 715, the method 700 can also include accounting for storage object consumption of the storage consumer across the heterogeneous storage objects in a step 725. The step 725 can be performed by the capacity accounting module 412. Based on the accounting of the storage object consumption, the method 700 can further include the analytics module 420 determining a storage consumption pattern in a step 730. For example, the storage consumption pattern can include a minimum and a maximum storage capacity consumed in the past year. The storage consumption pattern can also include an average storage space consumed by a storage consumer. The storage consumption pattern can also include a storage consumption trend, such as an average storage capacity consumed per day, per month, or per week. The storage consumption pattern allows the storage provider to determine what to charge the storage consumers using what kind of cost model. The accounting can be used to calculate the potential revenue from the storage consumers and the potential cost of maintaining the storage service. From the storage consumer side, the storage consumption pattern allows a storage consumer to determine how much is paid to the storage provider, and whether a change in payment plan or storage tier can benefit the storage consumer.

From the storage consumption pattern, the analytics module 420 can assign a new storage tier for a first storage object of the storage consumer to reduce an original storage cost of the first storage object. The original storage cost can be identified from the storage cost accounting of the step 720. The assignment of the new storage tier includes determining the new storage tier, at a reduced storage cost compared to the original storage cost that can satisfy the storage consumption pattern.

Figure 8:
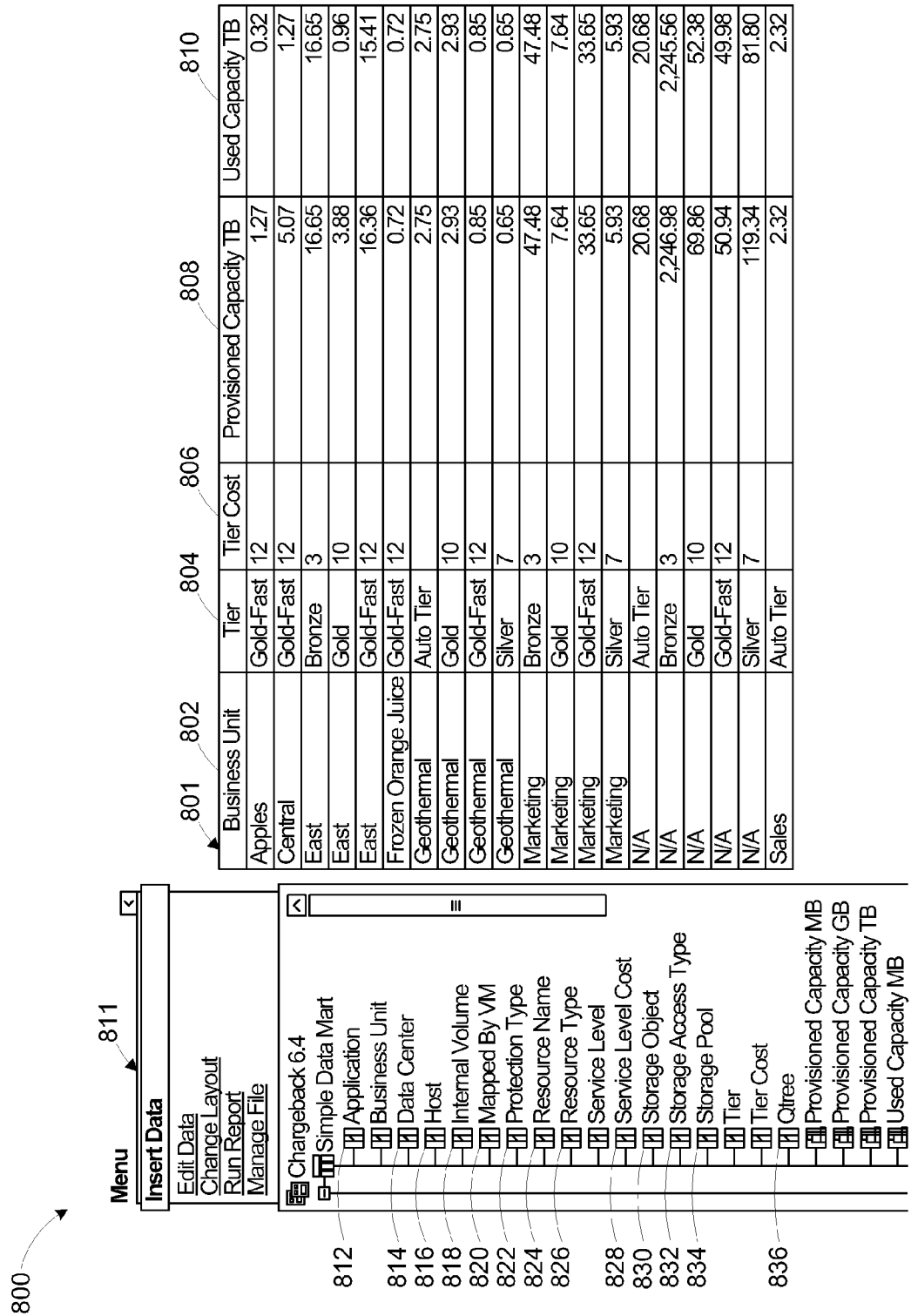
FIG. 8 is a user interface diagram illustrating an example of a user interface of the capacity accountability system.

FIG. 8 is a user interface diagram illustrating an example of a user interface 800 of the capacity accountability system 102. The user interface 800 can be generated by the interface module 414. The user interface 800 provides a storage administrator access to the storage object relation store 410 constructed by the storage relation module 408. The user interface 800 facilitates generation of a report 801 to answer a question regarding used or provisioned capacity and the storage cost associated with such use or such provisioned application.

The user interface 800 includes an example of the report 801 generated for a number of storage consumers. For example, the report 801 includes a consumer identity 802, such as by business units, a tier level 804, a tier cost 806, a provisioned capacity 808, and a consumed capacity 810. The report 801 can be sorted by any of the above variables. The example interface 800 also includes a menu 811. The menu 811 includes additional ways to sort, filter, and organize the report 801. For example, the menu 811 can include sorting or filtering of the report 801 by a service application 812, a data center 814, a host 816, an internal volume 818, or a virtual machine 820, each of which can be a storage consumer account. The menu 811 can also include sorting or filtering of the report 801 by a protection type 822, a resource name 824, a resource type 826, a service cost 828, a storage object identifier 830, a storage access type 832, a storage pool identifier 834, or a specific containment level 836, each of which can be a storage object type or a storage object service type that defines the tier level 804. Here, for example, the specific containment level 836 enables the capacity accounting module 412 to sort the report 801 by the identifier of a specific storage object hierarchy level, such as a Q-tree.

The user interface 800 can be access in a variety of ways. For example, configuration and generation of the report 801 is available to storage provider and storage consumer administrators in at least three ways:

Public API—accessing the capacity accountability system 102 directly through the API module 416, such as via database queries or custom interface messages.

Pre-specified reports—receiving automatically generated versions of the report 801 from the capacity accountability system 102 pre-configured for the storage administrators.

Drag-And-Drop reports—configuring the report 801 through the interface module 414 by selecting specific filters and sorting variables as described above to create the report 801 on the fly.

The capacity accountability system 102 supports multi-tenancy of storage consumer administrators, limiting a storage consumer administrator user access only to the capacity-related data which was made available for the storage consumer administrator user by the storage provider administrator. The multi-tenancy is achieved by creating groups that include business entities at different levels of hierarchy (can be tenant, line of business, business unity or project) and assigning the storage consumer administrator user to certain groups.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Therefore, it is manifestly intended that embodiments of this invention be limited only by the following claims and equivalents thereof.

What is claimed is:

1. A method comprising:
   ascertaining, in a data processing system of a networked storage environment having a plurality of storage devices managed by a plurality of storage nodes, a set of heterogeneous storage objects representing data containers provisioned for a storage consumer, where the heterogeneous storage objects store data in at least two different manners including being accessible using two different access protocols and stored using at least two different storage devices, and the heterogeneous storage objects are categorized by storage object hierarchy levels in a storage object hierarchy, wherein the storage object hierarchy levels include a logical unit number (LUN) at a highest storage object hierarchical level denoting a largest accessible data container capable of storing lower level data containers including a volume at a lowest storage object hierarchical level that denotes a smallest accessible data container;
   identifying, in the data processing system, an association between the storage consumer and a storage object hierarchy level;
   accounting for storage object consumption of the storage consumer, in the data processing system, by normalizing storage consumption data at the storage object hierarchy level across the set of the heterogeneous storage objects according to the storage object hierarchy; wherein normalizing the storage consumption data includes discounting a first consumption data of a first storage object when a second consumption data of a second storage object has been accounted for and where the first storage object includes the second storage object and both the first storage object and the second storage object are within a same branch of a storage object hierarchy; and
   accounting for storage capacity allocation of the storage consumer by normalizing storage capacity allocation data at the storage object hierarchy level across the heterogeneous storage objects to reconcile duplicate capacity accounting based on relationships between a plurality of storage consumers.

2. The method of claim 1, further comprising calculating an idle capacity of the storage consumer based on the accounting of storage object consumption and the accounting of storage capacity allocation for the storage consumer.

3. The method of claim 1, wherein accounting for storage capacity allocation of the storage consumer includes accounting a single storage capacity allocation for a plurality of application services sharing storage space on a first storage object.

4. The method of claim 1, wherein ascertaining the set of heterogeneous storage objects includes determining the set by using a relationship data structure of storage consumer accounts and managed storage objects, the managed storage objects including the set of the heterogeneous storage objects.

5. The method of claim 1, further comprising calculating a storage usage trend based the accounting of storage object consumption.

6. The method of claim 5, further comprising determining a modification suggestion to a capacity allocation provision of the storage consumer based on the storage usage trend.

7. The method of claim 6, wherein determining the modification includes determining the modification based on a replication service frequency of a first storage object in the set of the heterogeneous storage objects.

8. The method of claim 6, wherein determining the modification includes determining the modification based on a utilization frequency of a first storage object in the set of the heterogeneous storage objects.

9. The method of claim 1, wherein accounting for storage object consumption of the storage consumer includes accounting a single storage object consumption for a plurality of application services sharing storage space on the first storage object.

10. The method of claim 1, wherein accounting for storage object consumption of the storage consumer includes accounting a single storage capacity consumption for a plurality of storage hosts mapping to the first storage object.

11. A processing system comprising:
    a processor;

a computer-readable storage medium storing modules executable by the processor, the modules including:
a database module configured to, when executed by the processor:
ascertain a set of heterogeneous storage objects representing data containers provisioned for a storage consumer of a networked storage environment having a plurality of storage devices managed by a plurality of storage nodes, where the heterogeneous storage objects store data in at least two different manners including being accessible using two different access protocols and stored using at least two different storage devices, and the heterogeneous storage objects are categorized by storage object hierarchy levels in a storage object hierarchy, wherein the storage object hierarchy levels includes a logical unit number (LUN) at a highest storage object hierarchical level denoting a largest accessible data container capable of storing lower level data containers including a volume at a lowest storage object hierarchical level that denotes a smallest accessible data container;
identify an association between the storage consumer and a storage object hierarchy level;
a capacity accounting module configured to, when executed by the processor, perform a storage accounting of storage object consumption of the storage consumer by normalizing storage consumption data at the storage object hierarchy level across the heterogeneous storage objects, where normalizing the storage consumption data includes discounting a first consumption data of a first storage object when a second consumption data of a second storage object has been accounted for and where the first storage object includes the second storage object and both the first storage object and the second storage object are within a same branch of a storage object hierarchy.

12. The processing system of claim 11, wherein the capacity accounting generation module is configured to perform the storage accounting including storage capacity allocation of the storage consumer by normalizing storage capacity allocation data at the storage object hierarchy level across the heterogeneous storage objects to reconcile duplicate capacity accounting based on relationships between a plurality of storage consumers.

13. The processing system of claim 11, further comprising a network module configured to provide an application programming interface to access the report generation module to generate the storage accounting report.

14. The processing system of claim 11, wherein accounting for storage object consumption of the storage consumer includes accounting a single storage object consumption for a plurality of application services sharing storage space on the first storage object.

15. The processing system of claim 11, wherein accounting for storage object consumption of the storage consumer includes accounting a single storage capacity consumption for a plurality of storage hosts mapping to the first storage object.

16. A method comprising:
ascertaining, in a data processing system of a networked storage environment having a plurality of storage devices managed by a plurality of storage nodes, a set of heterogeneous data container objects provisioned for a storage consumer, where the heterogeneous data container objects store data in at least two different manners including being accessible using two different access protocols and stored using at least two different storage devices, and the heterogeneous data container objects are categorized by data container object hierarchy levels in a data container object hierarchy; wherein a highest data container hierarchical level denotes a largest accessible data container capable of storing lower level data containers and a lowest data container hierarchical level denotes a smallest accessible data container;
identifying, in the data processing system, an association between the storage consumer and a data container object hierarchy level; and
accounting for data container consumption of the storage consumer, in the data processing system, by normalizing storage consumption data at the data container object hierarchy level across the set of the heterogeneous data container objects according to the data container object hierarchy;
wherein normalizing the storage consumption data includes discounting a first consumption data of a first data container object when a second consumption data of a second data container object has been accounted for; and
wherein the first data container object includes the second data container object and the first data container object and the second data container object are within a same branch of a data container object hierarchy.

17. The method of claim 16, wherein accounting for data container consumption of the storage consumer includes accounting a single data container consumption for a plurality of application services sharing storage space on the first data container object.

18. The method of claim 16, wherein accounting for data container consumption of the storage consumer includes accounting a single storage capacity consumption for a plurality of storage hosts mapping to the first data container object.

19. The method of claim 16, wherein ascertaining the set of heterogeneous data container objects includes determining the set by using a relationship data structure of storage consumer accounts and managed data container objects, the managed data container objects including the set of the heterogeneous data container objects.

20. The method of claim 16, wherein accounting for storage capacity allocation of the storage consumer includes accounting a single storage capacity allocation for a plurality of application services sharing storage space on the first data container object.

* * * * *